G. H. QUENNARD.
TIRE.
APPLICATION FILED JAN. 12, 1914.

1,143,781.

Patented June 22, 1915.

Attest:
C. O. Mitchell
A. V. Walsh

Inventor:
George H. Quennard
George Cook
Atty by

UNITED STATES PATENT OFFICE.

GEORGE H. QUENNARD, OF ALLENDALE, NEW JERSEY.

TIRE.

1,143,781.  Specification of Letters Patent.  Patented June 22, 1915.

Application filed January 12, 1914. Serial No. 811,536.

*To all whom it may concern:*

Be it known that I, GEORGE H. QUENNARD, a citizen of the United States, and a resident of Allendale, in the county of Bergen and State of New Jersey, have made and invented certain new and useful Improvements in Tires, of which the following is a specification.

My invention relates to an improvement in tires, such, for instance, as are used on motor vehicles, the object of the same being to provide a pneumatic tire, made up of a plurality of individual and separate units in order that in the event one unit be injured or destroyed, the remainder thereof will still operate to carry the vehicle to its point of destination, or to such other place as may be desired.

A further object of the invention is to so construct each individual unit that it may be readily attached to and detached from the rim of the wheel without in any wise removing or disturbing any of the other units.

A further object of the invention is to so construct each individual unit that it may be firmly, tightly and safely secured to the rim of the wheel, without danger of becoming accidentally detached or disengaged therefrom, either while in its inflated or deflated condition, the assembled units being possessed of all the advantages inherent in a pneumatic tire of ordinary construction.

With these and other ends in view the invention consists in certain novel features of construction and combination of parts as will be hereinafter fully described and pointed out in the claims.

Figure 1:
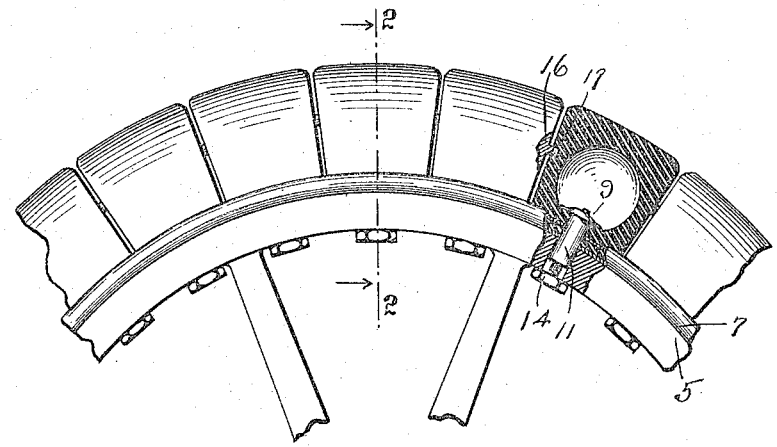
Figure 2:
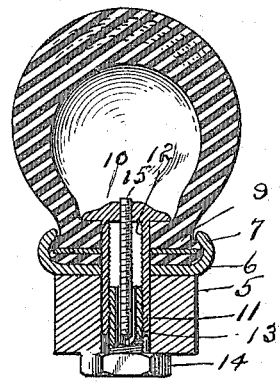
Figure 3:
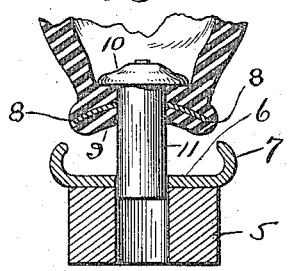

In the accompanying drawings, Figure 1 is a part of a wheel showing a number of assembled units in elevation, one of the same being shown in section. Fig. 2 is a sectional view taken on the line 2—2 of Fig. 1, looking in the direction as indicated by the arrows. Fig. 3 is a view in section of a part of a rim and of a part of an individual unit, the several parts being separated.

Referring to the drawings, 5 represents the felly of a wheel, having secured thereto, in any desired way, the rim 6, preferably made of metal and having its outer edges curved or bent into the form of retaining flanges 7, this rim, of course, extending entirely around the wheel and employed for the purpose of holding the units in their proper relative positions.

As all of the individual units are constructed exactly alike and are the counterparts of each other, a description of one will suffice for all.

Each individual unit consists of an air-tight receptacle, preferably made of canvas and rubber, the ends, or those sides which are adjacent each other when the units are assembled, being somewhat flattened, as illustrated in Fig. 1 of the drawing, the outer side being rounded, as illustrated in Fig. 2, the appearance of the tire when the several units have been assembled being that of the ordinary pneumatic tire. Furthermore, by flattening the ends of the unit, they may be made to fit tightly against each other, that is, the end of one unit will fit tightly and snugly against the end of the adjacent unit, especially when such units are in contact with the ground and subjected to the weight of the supported vehicle. Under the pressure thus exerted upon the tire, the individual unit will somewhat spread or flatten out, thus fitting tightly and snugly against each other and avoiding any and all danger of dirt or foreign material finding its way in between the units. While in Fig. 1 I have shown these units somewhat separated, such has been done for the purpose of better illustrating the invention; it will be understood, however, that in practice the several units will be so arranged that they will fit tightly and closely together. As clearly illustrated in Fig. 2 of the drawing, I prefer to construct these units with a somewhat thickened tread in order to increase the life or wearing qualities of the tire; the lower end or base of the unit is also somewhat increased in thickness, and, as illustrated in Fig. 3 of the drawing, has molded, or located therein, a curved plate 8, preferably made of sheet metal, and containing a certain amount of spring or resiliency. Through this base 9 of the unit, and also, through the spring 8, extends a hole or opening for the passage of the locking element, this element comprising an enlarged head 10, circular in outline and adapted to rest or fit snugly upon the inner surface of the base 9. From this head 10 extends a tube or barrel 11, threaded on its inner surface as illustrated at 12, this tube being of such length as to permit its passage entirely through the base 9 of the unit, through the rim 6 and partially through the felly 5, and into which tube is threaded the hollow bolt 13 provided with the head 14, the latter, when the parts are assembled as illustrated in Fig. 2, binding or impinging against the surface of the felly 5.

In assembling the parts, the base 9 of the unit is placed within the rim 6, the edges of the base being confined within the curved flanges 7. The normal shape of the base 9, and its contained plate 8, is such as illustrated in Fig. 3, that is, somewhat curved or arched, the width of the base being such that it may be fitted snugly in the rim 6. When, however, the hollow bolt 13 is inserted in the tube 11, and the latter drawn down by the turning of said bolt within the tube, the base 9, and contained plate 8, will assume the shape as illustrated in Fig. 2, that is, will assume a straightened or flattened shape, the tendency being to firmly lock the units in the rim 6, the large circular head 10 being firmly clamped upon the inner side or surface of the base, and the enlarged bolt head 14 having an extended bearing surface upon the surface of the rim or felly 5. Within the hollow tube 11 is contained a valve 15, of the type ordinarily used in pneumatic tires, and the like, whereby to inflate it, this valve being entirely inclosed and contained within the tube 11 and hollow bolt 13, thereby protecting it from the entrance of dust, dirt, or other foreign matter.

From the foregoing it will be understood that my invention is exceedingly simple, can be manufactured at a small initial cost, and is possessed of all the advantages inherent in the ordinary pneumatic tire. Furthermore, by reason of the peculiar construction and arrangement of the several parts, it is tightly and securely bound and held within the rim 6, there being little or no danger whatsoever of it becoming accidentally detached therefrom. Again, by reason of the peculiar shape of each of the individual units, they fit tightly against each other, and in order to assist in holding them in their proper relative positions, I form each of them with a lug or projection 16 adapted to fit into a recess 17 formed in the adjacent face of the next unit, such means assisting in preventing the lateral displacement of the several units when sustaining the weight of the supported vehicle. It will be understood, of course, that the projection 16 may be made integral with the casing of the unit itself, or may be made of metal molded or inserted within the said casing, each unit having upon one side the said lug 16, and upon the other side a recess 17, the several parts interlocking as clearly illustrated in Fig. 1.

What I claim is:—

1. The combination, with a wheel rim having a pair of oppositely disposed flanges, of a pneumatic unit provided with a base and with a metallic plate embedded within said base, said plate having a set, the tendency of which is to normally maintain said plate curved, and means for forcing said base against said rim so as to locate said plate between said flanges, and to flatten said plate in order to tighten said base against said flanges.

2. The combination, with a felly having a rim secured thereto and provided with flanges, of a plurality of pneumatic units secured to said rim, each unit having a base containing a metallic plate, means for forcing said base against said rim so as to flatten said plate and thus cause the edges of said base to press against said flanges, and a valve communicating with the interior of said pneumatic unit, said valve extending through said metallic plate.

Signed at New York, borough of Manhattan, in the county of New York and State of New York, this 10th day of January, A. D. 1914.

GEORGE H. QUENNARD.

Witnesses:
GEORGE E. COOK,
ANNA V. WALSH.

Copies of this patent may be obtained for five cents each, by addressing the "Commissioner of Patents, Washington, D. C."